Patented Aug. 28, 1934

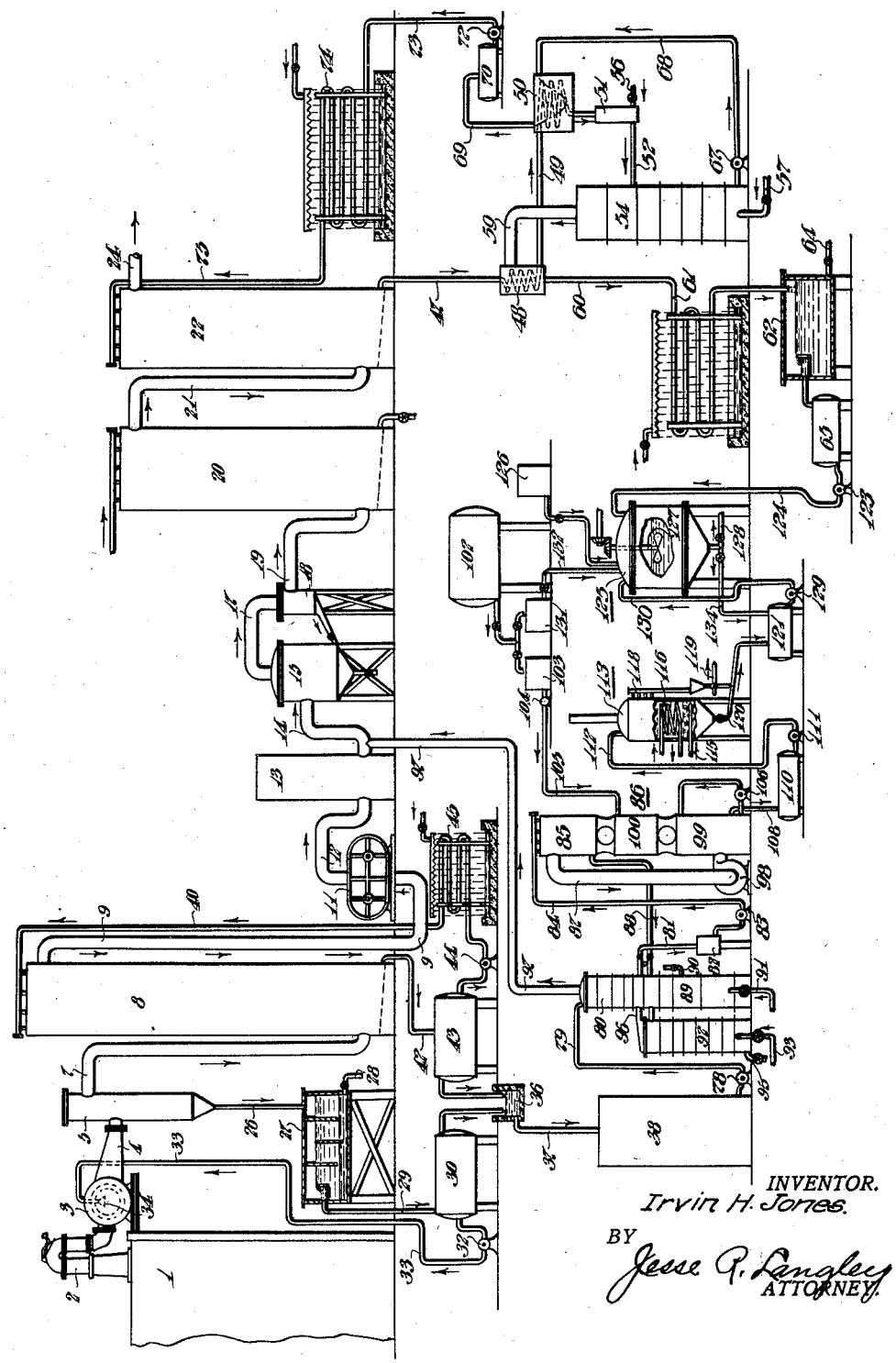

1,971,786

UNITED STATES PATENT OFFICE 1,971,786

PURIFICATION OF COAL DISTILLATION GAS BY-PRODUCTS

Irvin H. Jones, Pittsburgh, Pa., assignor to The Koppers Company of Delaware, a corporation of Delaware Application April 22, 1931, Serial No. 531,979

2 Claims. (Cl. 196—38)

My invention relates to the treatment or purification of fuel gas such as coal gas, coke oven gas, and the like, in preparation for consumption, and especially to the treatment of constituents of the gas recovered therefrom as by-products in the course of purification.

Fuel gases, such as coke oven gas, coal gas and the like, contain when produced, a wide variety of chemical compounds. It is general practice to remove certain of these compounds before utilization of the residual gas, some being removed because of their greater value when separated than as constituents of the gas and some being removed principally because they are undesirable in the gas.

These by-products and impurities are removed from the gas by a variety of processes, both chemical and physical, and generally require some treatment of a chemical nature to convert them into the most useful and valuable form. For example, hydrocarbon light oil as scrubbed from fuel gas in the usual manner contains certain unsaturated hydrocarbons which are undesirable in motor fuel, benzol, toluol and other fractions into which the light oil may be separated prior to utilization. These compounds are removed or converted into valuable constituents of the final product by washing the light oil or fractions thereof with a suitable acid such as sulphuric acid, phosphoric acid, or the like.

When the acid wash is completed, the acid or the sludge formed thereby is withdrawn, leaving the oil in an acidic condition due to the presence of traces of washing acid remaining therein and of sulphonic acids and the like formed during the wash. This acidity is undesirable and is neutralized by treating the acid washed light oil with a suitable alkaline medium such as caustic soda solution.

Crude fuel gas also contains ammonia which is usually removed in part by cooling the gas to condense ammoniacal gas liquor. This gas liquor is in contact with tar or tar fractions during and after its condensation, and is consequently contaminated with certain soluble constituents of the tar, especially the tar acids such as phenol and its homologues.

When gas liquor is distilled in the usual manner for recovery of ammonia, a major portion of its tar acid content remains in the ammonia still waste. Discharge of such still waste to streams or other bodies of water is in many instances prohibited by regulations designed to prevent the phenolic pollution of water which may subsequently constitute a municipal water supply. As it frequently happens that no other means of disposing of the still waste is available or feasible, it has become increasingly necessary to remove the tar acids from the still waste or from the gas liquor itself.

To accomplish this desired removal of tar acids, several processes of dephenolization have been developed whereby tar acids are removed from the gas liquor by a suitable transfer agent, and then given up to an absorbing medium, which is usually an alkali such as caustic soda. Various transfer agents have been employed including benzol, ammonia vapor, steam, and inert gases. A particularly efficient and economical process in which phenols are removed from ammonia liquor by a hot recirculated vapor or saturated gas is described in a copending application of J. A. Shaw, Serial No. 230,570, filed November 2, 1927.

Regardless of the type of transfer agent used, the tar acids react with the alkali absorbent, for example, sodium hydroxide solution, to form salts. The transfer agent is thereby at least partially purified from tar acids, and may be recirculated if desired to remove tar acids from a further quantity of gas liquor. As the predominating tar acid is phenol, the salts formed in solution by the above-mentioned reaction may be considered as sodium phenolate, although it is understood that analogous compounds of cresols and other homologues of phenol may also be present.

The phenolate solution may be withdrawn from the dephenolizing system and "sprung" by treatment with an acid, preferably an acid gas such as carbon dioxide or gases containing it, and the phenols thereby liberated may be recovered in salable form. The value of these recovered phenols offsets the cost of their recovery at least in part, but since dephenolization is fundamentally a nuisance operation, it is essential that all costs be kept as low as possible and that the maximum value be obtained from all reagents and products.

A preferred means of insuring economical operation of dephenolizing systems is to make them as completely automatic as possible. This can readily be done in the case of the vapor recirculation process referred to hereinabove, for example, but when operation is automatic or mechanically controlled, at least enough fresh absorbent, such as caustic soda solution, must be supplied at all times to provide for removal of the maximum amount of tar acids contained in the gas liquor at any time.

As the tar acid content of the gas liquor ordinarily varies over a comparatively wide range and as it is furthermore desirable always to have present an excess of absorbent, the conversion of caustic to phenolate by absorption of tar acids removed from the gas liquor seldom exceeds 50% to 70%.

In processes in which the transfer agent is recirculated, such as the vapor recirculation process, the caustic or other absorbent for tar acids is the only reagent consumed. Its cost is in all processes an important item in the cost of dephenolization. Consequently, a considerable saving can be effected by further utilizing the alkalinity of the phenolate or caustic-phenolate solution. A process in which this is done has been described by A. R. Albright in Patent No. 1,859,015.

In the Albright process, the alkalinity of phenolate or caustic-phenolate solutions produced in the dephenolization of gas liquor and the like is utilized in neutralizing acid-washed light oil. By this practice, the remarkable result is achieved that the caustic consumption for both dephenolization and light oil purification is no greater than it was previously for light oil purification alone, and the tar acids or phenols obtained by springing the solution withdrawn from contact with the neutralized light oil are still available in salable form to counteract the other costs of dephenolization.

However, it has been found in some instances that due to the powerful solvent action of phenol and phenolates, or to the hydrotropism of the latter, certain constituents of the crude light oil are removed by the phenolate during neutralization and retained in the recovered phenols. These compounds are frequently of a resinous nature, and they sometimes impair the value of the recovered phenols to such an extent that it is necessary to dispose of the product recovered at a greatly reduced price.

Furthermore, in some instances, as when the crude light oil is fractionated before purification, it has been found that part of the phenols are given up by the phenolate to the light oil. This results in the recovery of a decreased quantity of phenols.

It is obvious that the decrease in revenue from recovered phenols resulting from either of these contingencies tends to offset the economy resulting from the double utilization of the caustic, and may therefore lead to restricted practice of dephenolization and consequent injury to the public health.

An object of my present invention is to provide a process of treating fuel gas whereby the recovery of by-products and the elimination of contaminated wastes are accomplished in a more economical and efficient manner than has been possible heretofore.

A second object of my invention is to provide a method whereby the alkalinity of caustic provided for use in the dephenolization of gas liquor is utilized as economically as possible.

Another object of my invention is to provide a process of neutralizing acid-washed light oil in two stages, in which sodium carbonate is employed in the first stage.

A further object of my invention is to provide a method of utilizing the alkalinity of phenolate or caustic-phenolate solutions to neutralize acid-washed light oil without adverse effect upon the phenols recovered.

My invention has for further objects such other operative advantages and results as are found to obtain in the process hereinafter described and claimed.

According to my present invention, fuel gas such as coke oven gas or the like is treated in the usual manner to remove tar, ammonia and light oil. The ammoniacal gas liquor is dephenolized by any desired process, such as vapor recirculation or washing with benzol or other immiscible solvents, and the tar acids originally contained therein are transferred to an alkaline absorbent with which they react to form phenolate.

The phenolate is sprung by treatment with carbon dioxide, flue gas, or the like and the tar acids are liberated and separated from the aqueous solution of carbonates and bicarbonates. These tar acids are uncontaminated with resins or other undesirable impurities and consequently of a very high quality. No substantial loss is possible because of their relatively low solubility in the carbonate-bicarbonate solution.

The carbonate solution is then withdrawn from the springing tank and used to neutralize acid-washed light oil. I have found that efficient results are obtained when the light oil has been previously washed with either dilute or concentrated acid. The salt solution formed during neutralization is substantially free from tar acids, and consequently may be withdrawn from contact with the oil and disposed of as desired.

If the supply of carbonate solution from the springing of sodium phenolate is not sufficient to neutralize the oil, or if for any other reason further alkaline washing is desirable, the carbonate wash is followed by a second wash with caustic soda or other suitable alkali. Alkali for this second wash may be supplied in excess and withdrawn from contact with the light oil and added to a further quantity of carbonate solution for use in the first alkaline wash of a further quantity of oil.

With the objects set forth above and other objects in view, I now describe with reference to the accompanying drawing a preferred method of practicing my improved process of recovering and treating by-products of fuel gas manufacture. In the drawing, The single figure is a partially diagrammatic view, partly in elevation and partly in vertical section of apparatus suitable for the practice of my present invention.

Fuel gas is produced in a retort or coke oven 1, usually one of a battery of similar ovens or retorts, and passes through an ascension pipe 2 into a hydraulic main or collecting main 3. In this main it is contacted with flushing liquor which cools the gas and condenses certain constituents such as tar and fixed ammonia therefrom. The gas and the flushing liquor and condensate pass through an offtake 4 into a pitch trap 5 wherein the gas is separated from the liquor.

The gas passes from the upper part of the trap 5 through a pipe 7 into a primary cooler 8. In this cooler 8 the temperature of the gas is further reduced by transfer of its heat to cooling water or liquor, and further condensation results. The gas then continues through a pipe 9, an exhauster 11 and a pipe 12 into a tar extractor and reheater 13 in which the remainder of the tar is removed and the temperature of the gas is raised somewhat.

The gas then passes through a pipe 14 into an ammonium sulphate saturator 15 in which the ammonia remaining in the gas is removed. The gas substantially free from tar and ammonia then passes through a pipe 17, an acid separator 18 and a pipe 19 into a final cooler 20. In this cooler the temperature of the gas is reduced to substantially atmospheric temperature by cooling liquor which may or may not be recirculated.

The cooled gas then passes through a pipe 21 into a light oil scrubber 22 or a series of such scrubbers in which the light oils such as benzol, toluol and the like are removed. It then passes out of the light oil scrubber through a pipe 24 for further purification or other disposal.

Condensate and flushing liquor separated from the gas in the pitch trap 5 pass from the bottom of the trap through a pipe 26 into a hot drain tank 27. In this tank, tar is at least partially separated from the aqueous liquor and is withdrawn through a pipe 28. The liquor flows from the hot drain tank through a pipe 29 into a flushing liquor circulating tank 30.

From this tank 30, flushing liquor is withdrawn by a pump 32 and delivered through a pipe 33 which may terminate in sprays 34 or other suitable distributing devices in the hydraulic main 3. This flushing liquor serves to partially cool and condense further quantities of gas, and is returned with the condensate to the hot drain tank 27 as before. Excess liquor overflows from the tank 30 into a trench 36 or other suitable collecting means from which it passes through a pipe 37 into an ammonia liquor storage tank 38.

Cooling liquor is delivered to the primary cooler 8 through a pipe 40. This cooler may be of the direct or indirect type. In the present instance, the cooler 8 is of the direct type and the liquor passes downwardly through the cooler in intimate contact with the countercurrently flowing gas.

The liquor collects with condensate from the gas near the bottom of the cooler and flows through a pipe 42 into a cooling liquor circulating tank 43. From this tank, the liquor is withdrawn by a pump 44 and recirculated through a water cooler 45 and pipe 46 into the cooler 8 to cool further quantities of gas.

Excess cooling liquor overflows from the tank 43 into the collecting trench 36 from which it passes to the ammonia liquor storage tank 38. If desired, the tank 43 may be omitted. Recirculation and discharge of excess liquor are then effected directly from a sump or well at the bottom of the cooler 8. Condensate from other parts of the system, such as the exhauster and tar extractor, may be returned to the hot drain tank 27.

In the light oil scrubber (or scrubbers) 22, light oils are absorbed from the gas by wash oil or scrubbing oil, which is thereby enriched. The enriched wash oil passes from the bottom of the scrubber 22 through a pipe 47, a vapor-to-oil heat exchanger 48, a pipe 49, an oil-to-oil heat exchanger 50, a final heater 51 and a pipe 52 into a wash oil still or stripping still 54. The temperature of this enriched oil is raised in the heat exchangers 48 and 50 and may be further raised in the final heater 51 by steam admitted through a pipe 56.

The hot enriched oil passes downwardly through the still 54 in countercurrent flow with steam introduced through a pipe 57. This steam removes the light oils from the enriched wash oil, and vapors consisting chiefly of light oils and steam pass from the top of the still through a pipe 59. These vapors pass through the vapor-to-oil heat exchanger 48 in which they are partially cooled and condensed, then continue through a pipe 60 to a light oil condenser 61 in which their cooling is completed.

The condensed light oil passes from the cooler 61 into a decanter 62 in which the oil is separated from water. The water is withdrawn from the bottom of the decanter through a pipe 64 and the crude light oil flows into a light oil storage tank 65.

The stripped or debenzolized wash oil is withdrawn from the bottom of the still 54 and delivered by a pump 67 through a pipe 68, the oil-to-oil heat exchanger 50, and a pipe 69 into a wash oil storage tank 70. This oil may also be passed through a decanter in which water and muck are separated from the oil before its entry into the tank 70, if desired, or the tank 70 may itself be used as a decanter. The debenzolized wash oil is withdrawn from the wash oil storage tank and recirculated by a pump 72 through a pipe 73, a wash oil cooler 74 and a pipe 75 over the scrubber or scrubbers 22 wherein it absorbs light oils from further quantities of gas.

Ammonia liquor is withdrawn from the ammonia liquor storage tank 38 by a pump 78 and delivered through a pipe 79 into a free ammonia still 80. The liquor passes downwardly through this still, wherein free ammonia and other volatile constituents are removed by a countercurrent flow of steam or other hot vapor, and then passes from the bottom of the free still through a pipe 81 into a surge tank 82.

A pump 83 withdraws liquor from the tank 82 and delivers it through a pipe 84 into the ammonia liquor section or stripping section 85 of a dephenolizer 86, which in the present instance is of the vapor recirculation type referred to hereinabove. In this section 85, tar acids are removed from the liquor by a countercurrent flow of hot vapor or saturated gas. The gas is thereby fouled or enriched with tar acids, and passes from the stripping section 85 of the dephenolizing tower 86 through a downcomer 87.

The dephenolized liquor substantially free from tar acids flows from the bottom of the stripping section 85 of the dephenolizer through pipe 88 to a lime mixing chamber 89, which may conveniently be located beneath the free ammonia still 80. In this chamber, the liquor is mixed with milk of lime or other suitable alkaline material introduced through a pipe 90, and fixed ammonia contained in the liquor is thereby liberated.

The mixture of lime and liquor may be agitated and heated when necessary by steam admitted to the chamber 89 through a pipe 91. The hot liquor then overflows from the liming chamber 89 to a fixed ammonia still 92, where its distillation is completed by means of steam introduced through a pipe 93.

The distilled liquor or still waste is withdrawn from the bottom of the still 92 through a pipe 95 substantially free from ammonia and tar acids, and may be discharged as desired. Vapors pass from the top of the fixed still 92 through a pipe 96 into the bottom of the free still 80 through which they continue upward, serving to remove free ammonia from further quantities of liquor. The combined still vapors pass from the top of the free still 80 through a pipe 97 and may conveniently be returned to the gas stream near its point of entry into the saturator 15.

The saturated gas or vapor, which serves as a transfer agent for the tar acids in the present instance, after enrichment with tar acids in the stripping section 85 of the dephenolizer passes through the downcomer 87 and is recirculated by a blower 98 through the absorbing sections 99 and 100 of the dephenolizer. In these sections, the tar acids are removed from the enriched transfer agent by an alkali absorbent such as caustic soda solution.

Solid caustic soda, or concentrated solution withdrawn from a tank 102, is made up into a solution of the desired strength which is usually from 3% to 25%, and preferably about 10% NaOH, in a fresh caustic mixing tank 103. From this tank it is withdrawn by a pump 104 and delivered preferably intermittently through a pipe 105 into the fresh caustic section or shot section 100 of the dephenolizer 86.

The caustic solution passes downwardly over contact material in this section 100 in countercurrent with the recirculated vapor, from which it removes the last traces of tar acids. The solution then passes downwardly into the lower section or recirculating section 99 of the dephenolizer. Caustic or caustic-phenolate solution is recirculated over this section 99 by a pump 106. The comparatively fresh caustic from the shot section 100 is mixed with the solution recirculated over this section, and serves to refresh it.

The bulk of the tar acids is removed from the recirculated vapor in the lower section 99. Removal is completed in the shot section 100 and vapor substantially free from tar acids enters the stripping section 85 to remove tar acids from further quantities of gas liquor. The caustic is at least partially converted to phenolate by the absorption of tar acids from the recirculated vapor, and excess phenolate or caustic-phenolate solution overflows from the recirculatory system through a pipe 108 to a phenolate storage tank 110.

In some instances it may be preferable to have a plurality of recirculating sections similar to the lower section 99 described hereinabove, and in other cases it may be preferable to omit recirculation of the absorbent and have as the absorbing stage of the dephenolizer only a shot section similar to section 100. It is to be understood that my invention is not limited with respect to the number of absorbing sections used in the dephenolizer, nor is it limited to the use of gas or vapor as the transfer agent by means of which the tar acids are removed from the liquor and conveyed to the alkaline absorbent with which they react to form phenolate.

Phenolate solution is withdrawn from the phenolate storage tank 110 by a pump 111 or other suitable means and delivered through a pipe 112 into a springing tank 113. In this tank the phenolate is sprung or carbonated by carbon dioxide, flue gas, or the like, which is introduced into the springing tank through a perforated pipe 115 or other suitable distributing means.

The solution is kept at the desired temperature by means of a steam coil 116. Carbon dioxide in the gas reacts with the phenolate to form carbonates, usually sodium carbonate and bicarbonate, and to liberate the tar acids which separate in a layer on top of the aqueous carbonate solution. The tar acids are withdrawn through pipes 118 and 119 to storage tanks (not shown) or other points of disposal. The carbonated solution is then withdrawn from the springing tank through a pipe 120 into a carbonate storage tank 121.

Crude light oil is withdrawn from the light oil storage tank 65, as by a pump 123, and delivered through a pipe 124 into a light oil agitator 125. In this agitator it is mixed with acid, such as sulphuric acid of suitable strength supplied from a tank 126, by a stirrer 127 or other suitable mixing device. The acid serves to remove or convert undesirable constituents of the crude light oil.

Other substances present after washing, such as spent acid or the sludge formed during the acid wash, separate from the light oil and settle to the bottom of the agitator 125. They are then withdrawn through a pipe 128 for any desired disposal.

After withdrawal of the spent acid or sludge, the oil remaining in the agitator is somewhat acid, as stated hereinabove. To neutralize this acidity, carbonate solution from the carbonate storage tank 121 is delivered by a pump 129 or other suitable device through a pipe 130 into the agitator 125 and stirred or mixed with the oil to insure adequate contact. The carbonate reacts with the acids in the oil, forming salts which remain in the aqueous solution and settle to the bottom of the agitator. The salt solution may then be withdrawn through pipe 128 and disposed of as desired.

If the supply of carbonate solution from the springing tank is not sufficient to neutralize all of the acidity in the oil, the oil is given a second alkaline wash with caustic soda solution or the like. This solution is made up in a tank 131 and admitted to the agitator through pipe 132. In the agitator it is mixed with the oil as in the case of the previous wash.

In this second wash, alkali is preferably supplied in excess of the amount required for neutralization of remaining traces of acid. After this wash is complete, the solution which settles to the bottom of the agitator is still somewhat alkaline, and may be withdrawn through a pipe 134 to the carbonate storage tank 121.

In that case it is mixed with further quantities of springing-tank carbonate solution and forms a part of the first alkaline wash liquor for a further quantity of acid-washed light oil. Alternatively, some other means of disposal of this partially spent alkali can be employed. It may, for example, be used in the purification of fuel gas from acidic constituents such as $H_2S$.

It is to be understood that the expression "carbonate solution" is used hereinabove to refer to an aqueous solution obtained by carbonating sodium phenolate solution or a solution containing sodium phenolate and sodium hydroxide, preferably with a gas containing carbon dioxide such as flue gas. This solution may and usually does contain sodium bicarbonate as well as sodium carbonate, and the carbonation may be so conducted that conversion to sodium bicarbonate is substantially complete. The solution may also contain salts of other acidic constituents of the gas liquor or of the gas used for springing.

It is usually preferable to so operate the dephenolizing system that the caustic-phenolate solution discharged to storage contains the equivalent of about 10% NaOH by weight. When this solution is sprung, the resulting carbonate solution is substantially saturated at temperatures near or slightly above atmospheric, and consequently smaller volumes of liquid are handled than when more dilute solutions are employed. However, my invention is not limited to the use of solutions containing any particular concentration of sodium carbonate or bicarbonate.

In most instances, the carbonate solution withdrawn from the springing tank is suitable for immediate use in the treatment of acid-washed light oil, as described hereinabove, but my invention is not limited to use of the solution without further treatment after removal of tar acids liberated by springing. Although the major portion of the liberated tar acids is readily separated from the solution after conversion of the phenolate to carbonate (or bicarbonate) is completed, a portion of the tar acids may remain dissolved in the aqueous liquid. Since these dissolved tar acids are not combined chemically with constituents of the solution, they may be given up to the light oil, in which they are more soluble, during the washing process.

This is not necessarily a disadvantage, as the decrease in the amount of tar acids recovered is slight, and the light oil, particularly at plants producing motor fuel, is improved because of the known anti-knock properties of phenols. However, tar acids dissolved in the carbonate solution can be readily removed if desired by boiling the solution, with or without aeration. I may also boil the solution with lime to convert bicarbonate to carbonate, or to partially or completely recausticize the sodium compounds.

When acid-washed light oil is treated with carbonate solution and then with a fresh caustic solution, as described hereinabove, tar acids or other acidic constituents of the carbonate solution given up to the light oil are removed by the subsequent wash with caustic. The caustic may then be treated for recovery of the tar acids if desired.

My invention has been described with particular reference to the treatment of acid-washed light oil with carbonate solution, with or without a subsequent treatment with caustic, but it is to be understood that an analogous treatment of acid-washed light oil fractions or cuts, such as benzol, toluol, solvent naphtha, and motor fuel, is also contemplated.

It will be readily seen that by means of my present invention double utilization of the caustic originally supplied for dephenolization is obtained. The alkalinity of this solution after its carbonation in the springing tank is entirely suitable for use in the neutralization of acid-washed light oil, or fractions thereof, and by springing the phenolate before its use for this purpose a very high grade of phenols is obtained. Thus it is possible to effect the economy resulting from double utilization of the alkalinity required in either of these processes, without the disadvantage of impairing the quality or diminishing the quantity of tar acids recovered.

It will be obvious to those skilled in the art that various modifications can be made in the several parts of my apparatus and the several steps of my process without departing from the spirit of my invention and it is my intention to cover in the claims such modifications as are included within the scope thereof.

I claim as my invention:

1. In the recovery of by-products from coal distillation gas, the process comprising separating out tar acids and light oil from the coal distillation gas, separating out these tar acids with a sodium hydroxide solution by passing carbon dioxide gas therein, thereby liberating the tar acids and forming sodium carbonate, and immediately using the resulting carbonate solution to neutralize said light oil which has first been treated with sulphuric acid.

2. In the recovery of by-products from fuel gas containing tar acids, the process comprising separating out tar acids and light oil from fuel gas containing the same, separating out these tar acids with a sodium hydroxide solution by passing carbon dioxide gas therein, thereby liberating the tar acids and forming sodium carbonate, and immediately using the resulting carbonate solution to neutralize said light oil which has first been treated with sulphuric acid.

IRVIN H. JONES.